US010392970B2

(12) United States Patent
Ertas et al.

(10) Patent No.: US 10,392,970 B2
(45) Date of Patent: Aug. 27, 2019

(54) ROTOR SHAFT ARCHITECTURES FOR A GAS TURBINE ENGINE AND METHODS OF ASSEMBLY THEREOF

(71) Applicant: General Electric Company, Schenectady, NY (US)

(72) Inventors: Bugra Han Ertas, Niskayuna, NY (US); Brandon Wayne Miller, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 378 days.

(21) Appl. No.: 15/341,838

(22) Filed: Nov. 2, 2016

(65) Prior Publication Data

US 2018/0119574 A1    May 3, 2018

(51) Int. Cl.
  *F01D 25/16*    (2006.01)
  *F01D 5/02*    (2006.01)
  (Continued)

(52) U.S. Cl.
  CPC ............. *F01D 25/164* (2013.01); *F01D 5/02* (2013.01); *F01D 15/12* (2013.01); *F02C 7/06* (2013.01); *F02K 3/00* (2013.01); *F02K 3/06* (2013.01); *F04D 29/053* (2013.01); *F04D 29/056* (2013.01); *F04D 29/321* (2013.01); *F05D 2220/32* (2013.01); *F05D 2230/60* (2013.01);
  (Continued)

(58) Field of Classification Search
  CPC .......... F01D 25/16; F02C 7/06; F04D 29/056; F05D 2260/40311
  See application file for complete search history.

(56) References Cited

U.S. PATENT DOCUMENTS 3,792,586 A * 2/1974 Kasmarik ............. F01D 25/162
  384/141
4,790,133 A * 12/1988 Stuart ..................... F02C 3/067
  415/65
(Continued)

OTHER PUBLICATIONS

Dewanji et al., "Feasibility Study of Some Novel Concepts for High Bypass Ratio Turbofan Engines", ASME Turbo Expo 2009: Power for Land, Sea, and Air, vol. 1, pp. 51-61, 2009.
(Continued)

*Primary Examiner* — Ninh H. Nguyen
(74) *Attorney, Agent, or Firm* — Armstrong Teasdale LLP (57) ABSTRACT

A shaft assembly for a rotary machine, the rotary machine includes a low pressure compressor, a high pressure compressor, a high pressure turbine, and a low pressure turbine. The shaft assembly includes an outer shaft configured to couple the high pressure compressor to the high pressure turbine. The outer shaft includes a first forward bearing assembly positioned forward of the high pressure compressor, and a first aft bearing assembly positioned between the high pressure compressor and the high pressure turbine. The shaft assembly also includes an inner shaft rotatable about a common axis with the outer shaft that at least partially extends about the inner shaft. The inner shaft is configured to couple the low pressure compressor to the low pressure turbine. The inner shaft includes a second forward bearing assembly positioned forward of the low pressure compressor, and a second aft bearing assembly positioned proximate the high pressure turbine.

18 Claims, 4 Drawing Sheets

(51) Int. Cl.
  *F01D 15/12*   (2006.01)
  *F04D 29/053*   (2006.01)
  *F04D 29/056*   (2006.01)
  *F04D 29/32*   (2006.01)
  *F02K 3/00*   (2006.01)
  *F02C 7/06*   (2006.01)
  *F02K 3/06*   (2006.01)

(52) U.S. Cl.
  CPC .................. *F05D 2240/60* (2013.01); *F05D 2260/40311* (2013.01)

(56) References Cited

U.S. PATENT DOCUMENTS

| | | | |
|---|---|---|---|
| 5,079,916 A * | 1/1992 | Johnson | B64C 11/48 |
| | | | 416/129 |
| 5,307,622 A * | 5/1994 | Ciokajlo | F02C 3/067 |
| | | | 415/65 |
| 6,183,388 B1 | 2/2001 | Hawkins | |
| 7,195,446 B2 * | 3/2007 | Seda | F01D 1/24 |
| | | | 415/229 |
| 7,716,914 B2 | 5/2010 | Schilling | |
| 2013/0025258 A1 * | 1/2013 | Merry | F02C 7/06 |
| | | | 60/226.1 |
| 2014/0090386 A1 | 4/2014 | Cloft et al. | |
| 2014/0363276 A1 | 12/2014 | Vetters et al. | |
| 2015/0267618 A1 | 9/2015 | Schwarz et al. | |
| 2016/0097330 A1 | 4/2016 | Venter | |
| 2016/0138478 A1 | 5/2016 | Negulescu | |

OTHER PUBLICATIONS

Joachim Kurzke, "Fundamental Differences Between Conventional and Geared Turbofans", ASME Turbo Expo 2009: Power for Land, Sea, and Air, vol. 1, pp. 145-153, 2009.

Mohd Tobi et al., "Development in Geared Turbofan Aeroengine", IOP Conference Series: Materials Science and Engineering, vol. 131.

* cited by examiner

ROTOR SHAFT ARCHITECTURES FOR A GAS TURBINE ENGINE AND METHODS OF ASSEMBLY THEREOF

BACKGROUND

The field of the disclosure relates generally to gas turbine engines and, more specifically, to rotor shaft architectures for gas turbine engines and methods of assembly thereof.

At least some known gas turbine engines, such as turbofans, include a core engine, a fan assembly, a low pressure compressor, and a low pressure turbine. The core engine includes a high pressure compressor, a combustor, and a high pressure turbine coupled together in a serial flow relationship. More specifically, the high pressure compressor and turbine are coupled through a high pressure rotatable shaft that is supported by a plurality of high pressure bearing assemblies to form a high pressure rotor assembly. The low pressure compressor and turbine are coupled through a low pressure rotatable drive shaft that is supported by a plurality of low pressure bearing assemblies to form a low pressure rotor assembly. Furthermore, the fan assembly is coupled to the low pressure rotor assembly through a power gearbox. Typically, the high pressure drive shaft and the low pressure drive shaft are co-axial shafts coupled in a serial relationship.

In operation, air is channeled through the low pressure compressor and high pressure compressor to increase pressure thereof. The compressed air is mixed with fuel and ignited at the combustor to generate a high energy gas stream. The high energy gas stream is channeled through the high pressure turbine to rotatably drive the high pressure compressor through the high pressure shaft. The high energy gas stream is then channeled through the low pressure turbine to rotatably drive the low pressure compressor and the fan assembly through the low pressure shaft. The power gearbox enables the low pressure shaft to rotate at a higher speed than the fan assembly, thereby, increasing efficiency of the low pressure turbine.

However, the operational rotational speed of the low pressure shaft is typically limited by a third natural frequency shaft bending mode. The low pressure shaft has natural frequencies that are in part defined by its stiffness, which is based on its geometry, material, and length. As such, during operation of turbofan engine, the low pressure shaft will vibrate at different frequencies depending in part on the rotational speed of the low pressure shaft. First and second natural frequency modes are rigid modes that induce forces into the turbofan engine that are absorbed by dampers coupled to the bearing assemblies. The third natural frequency mode, however, is a bending mode of the low pressure shaft that is excited when the rotational speed of the shaft coincides with the location of the third natural frequency. If the gas turbine engine operates at the third natural frequency mode, then bending is induced into the low pressure shaft between the bearing assemblies, increasing the induced forces of the rotor assembly with the potential of inducing rotordynamic instability therein. As such, gas turbine engines typically operate below rotational speeds which excite the third natural frequency mode of the low pressure shaft.

BRIEF DESCRIPTION

In one aspect, a shaft assembly for a rotary machine is provided. The rotary machine includes a low pressure compressor, a high pressure compressor, a high pressure turbine, and a low pressure turbine in a serial flow relationship. The shaft assembly includes an outer shaft configured to couple the high pressure compressor to the high pressure turbine. The outer shaft includes a first forward bearing assembly positioned forward of the high pressure compressor, and a first aft bearing assembly positioned between the high pressure compressor and the high pressure turbine. The shaft assembly also includes an inner shaft rotatable about a common axis with the outer shaft, the outer shaft at least partially extends about the inner shaft. The inner shaft is configured to couple the low pressure compressor to the low pressure turbine. The inner shaft includes a second forward bearing assembly positioned forward of the low pressure compressor, and a second aft bearing assembly positioned proximate the high pressure turbine.

In another aspect, a shaft assembly for a rotary machine is provided. The rotary machine includes a low pressure compressor, a high pressure compressor, a high pressure turbine, and a low pressure turbine in a serial flow relationship. The shaft assembly includes an outer shaft configured to couple the high pressure compressor to the high pressure turbine. The outer shaft includes a first forward bearing assembly positioned forward of the high pressure compressor, and a first aft bearing assembly positioned aft of the high pressure turbine. The shaft assembly also includes an inner shaft rotatable about a common axis with the outer shaft, the outer shaft at least partially extends about the inner shaft. The inner shaft is configured to couple the low pressure compressor to the low pressure turbine. The inner shaft includes a second forward bearing assembly positioned forward of the low pressure compressor, and a second aft bearing assembly positioned forward of the low pressure turbine. At least a portion of the second aft bearing assembly is positioned in a stacked relationship with the first aft bearing assembly.

In still another aspect, a method of assembling a shaft assembly for a rotary machine is provided. The rotary machine includes a low pressure compressor, a high pressure compressor, a high pressure turbine, and a low pressure turbine in a serial flow relationship. The method includes coupling the high pressure compressor to the high pressure turbine through an outer shaft. A first forward bearing assembly is coupled to the outer shaft forward of the high pressure compressor, and a first aft bearing assembly is coupled to the outer shaft between the high pressure compressor and the high pressure turbine. The method also includes coupling the low pressure compressor to the low pressure turbine through an inner shaft, the outer shaft at least partially extends about the inner shaft. A second forward bearing assembly is coupled to the inner shaft forward of the low pressure compressor, and a second aft bearing assembly is coupled to the inner shaft proximate the high pressure turbine. The method further includes positioning the outer shaft radially outward from the inner shaft to define a gap therebetween such that the inner shaft and the outer shaft are rotatable about a common axis.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations extending substantially parallel to a longitudinal axis of a gas turbine engine. Moreover, the terms "radial" and "radially" refer to directions and orientations extending substantially perpendicular to the longitudinal axis of the gas turbine engine. In addition, as used herein, the terms "circumferential" and "circumferentially" refer to directions and orientations extending arcuately about a longitudinal axis of the gas turbine engine.

Embodiments of the present disclosure relate to rotor shaft architectures for gas turbine engines that increase operational rotational speed of a low pressure shaft for geared turbofan engines. More specifically, in the exemplary embodiments, a rotor shaft assembly includes an outer or high pressure shaft that couples a high pressure compressor to a high pressure turbine. The rotor shaft assembly also includes an inner or low pressure shaft rotatable about a common axis with the high pressure shaft, and the low pressure shaft couples a booster compressor to a low pressure turbine. Each shaft, the high pressure shaft and the low pressure shaft, are supported by a plurality of bearing assemblies. An aft bearing assembly that supports the low pressure shaft is positioned proximate the high pressure turbine such that a low pressure shaft span is reduced and low pressure shaft stiffness is increased. As such, an operational rotational speed of the low pressure shaft within the turbofan engine is increased without inducing a bending or third natural frequency mode of the low pressure shaft.

Figure 1:
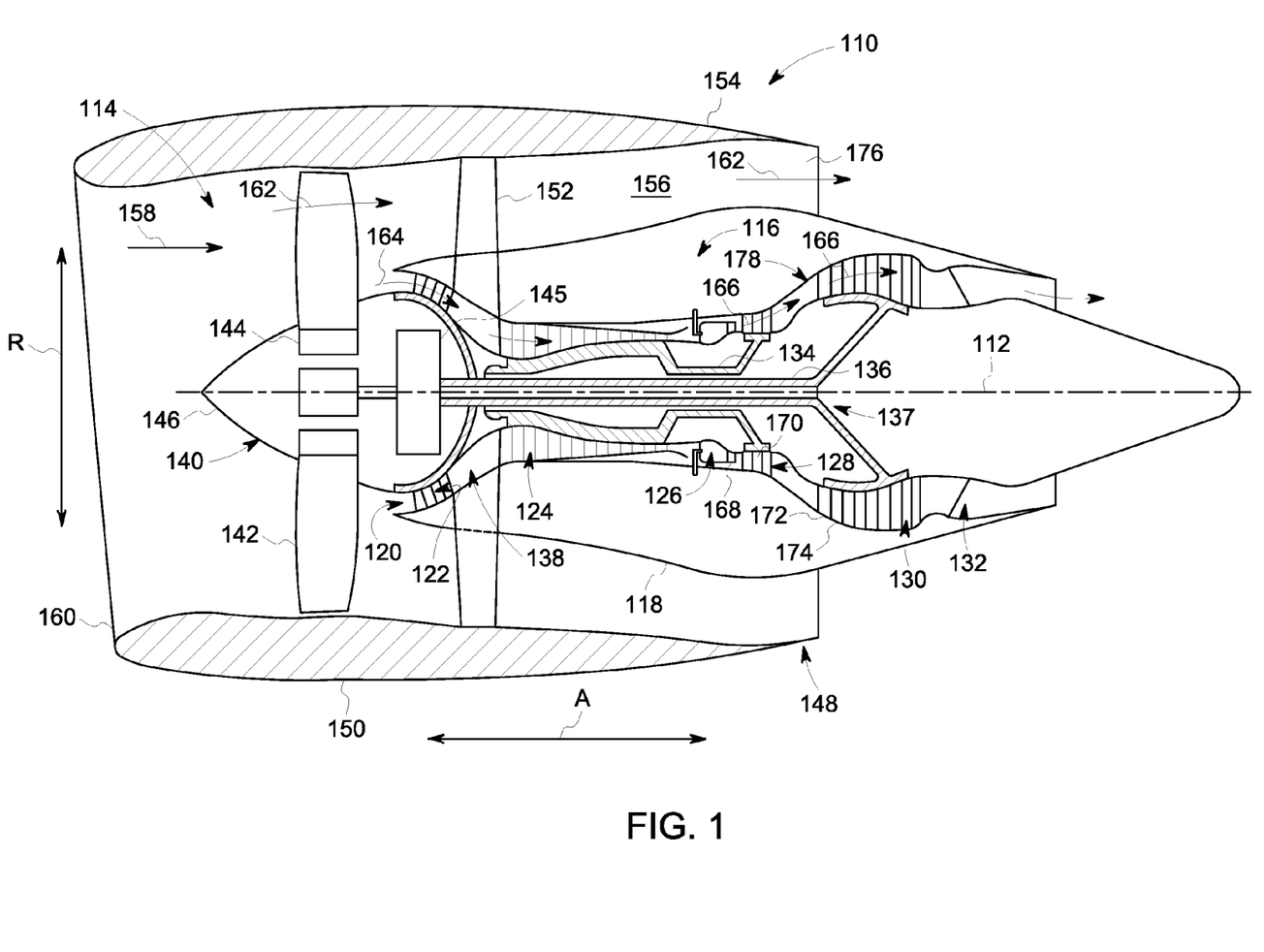
FIG. 1 is a schematic view of an exemplary turbofan engine, i.e., a gas turbine engine.

FIG. 1 is a schematic view of a gas turbine engine 110, e.g., a rotary machine or a turbomachine, in accordance with an exemplary embodiment of the present disclosure. In the exemplary embodiment, gas turbine engine 110 is a high-bypass turbofan jet engine 110, referred to herein as "turbofan engine 110." As shown in FIG. 1, turbofan engine 110 defines an axial direction A (extending parallel to a longitudinal axis 112 provided for reference) and a radial direction R. In general, turbofan engine 110 includes a fan assembly 114 and a core turbine engine 116 disposed downstream from fan assembly 114.

In the exemplary embodiment, core turbine engine 116 includes a substantially tubular engine casing 118 that defines an annular inlet 120. Engine casing 118 encases, in serial flow relationship, a compressor section including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft 134 drivingly connects HP turbine 128 to HP compressor 124. A low pressure (LP) or drive shaft 136 drivingly connects LP turbine 130 to LP compressor 122. HP shaft 134 at least partially extends about LP shaft 136 and both rotatable about longitudinal axis 112. HP shaft 134 and LP shaft 136 also define a shaft assembly 137 that will be discussed in further detail below in reference to FIG. 2. The compressor section, combustion section 126, turbine section, and nozzle section 132 together define a core air flowpath 138.

Fan assembly 114 includes a fan 140 having a plurality of fan blades 142 coupled to a disk 144 in a spaced apart manner. As depicted, fan blades 142 extend outwardly from disk 144 generally along radial direction R. Fan blades 142 and disk 144 are together rotatable about longitudinal axis 112 by LP shaft 136 across a power gearbox 145. Power gearbox 145 includes a plurality of gears for adjusting the rotational speed of fan 140 relative to LP shaft 136 to a more efficient rotational fan speed.

Disk 144 is covered by rotatable front hub 146 aerodynamically contoured to promote an airflow through plurality of fan blades 142. Additionally, fan assembly 114 and at least a portion of core turbine engine 116 are surrounded by a nacelle assembly 148, which includes an annular fan casing or outer nacelle 150 that circumferentially surrounds fan 140 and/or at least a portion of core turbine engine 116. In the exemplary embodiment, nacelle 150 is configured to be supported relative to core turbine engine 116 by a plurality of circumferentially-spaced outlet guide vanes 152. Moreover, a downstream section 154 of nacelle 150 extends over an outer portion of core turbine engine 116 so as to define a bypass airflow passage 156 therebetween.

During operation of turbofan engine 110, a volume of air 158 enters turbofan engine 110 through an associated inlet 160 of nacelle 150 and/or fan assembly 114. As volume of air 158 passes across fan blades 142, a first portion, a fan stream 162 of air 158 is directed or routed into bypass airflow passage 156 and a second portion 164 of air 158 is directed or routed into core air flowpath 138, or more specifically into LP compressor 122. A ratio between first portion 162 and second portion 164 is commonly known as a bypass ratio. The pressure of second portion 164 is then increased as it is routed through HP compressor 124 and into combustion section 126, where it is mixed with fuel and burned to provide combustion gases 166.

Combustion gases 166 are routed through HP turbine 128 where a portion of thermal and/or kinetic energy from combustion gases 166 is extracted via sequential stages of HP turbine stator vanes 168 that are coupled to engine casing 118 and HP turbine rotor blades 170 that are coupled to HP shaft 134, thus inducing HP shaft 134 to rotate, thereby supporting operation of HP compressor 124. Combustion gases 166 are then routed through LP turbine 130 where a second portion of thermal and kinetic energy is extracted from combustion gases 166 via sequential stages of LP turbine stator vanes 172 that are coupled to engine casing 118 and LP turbine rotor blades 174 that are coupled to LP shaft 136, thus inducing LP shaft 136 to rotate which induces power gearbox 145 to rotate LP compressor 122 and/or rotation of fan 140.

Combustion gases 166 are subsequently routed through jet exhaust nozzle section 132 of core turbine engine 116 to provide propulsive thrust. Simultaneously, the pressure of first portion 162 is substantially increased as first portion 162 is routed through bypass airflow passage 156 before it is exhausted from a fan nozzle exhaust section 176 of turbofan engine 110, also providing propulsive thrust. HP turbine 128, LP turbine 130, and jet exhaust nozzle section 132 at least partially define a hot gas path 178 for routing combustion gases 166 through core turbine engine 116.

Exemplary turbofan engine 110 depicted in FIG. 1 is by way of example only, and that in other embodiments, turbofan engine 110 may have any other suitable configuration, including, for example, a turboprop engine.

Figure 2:
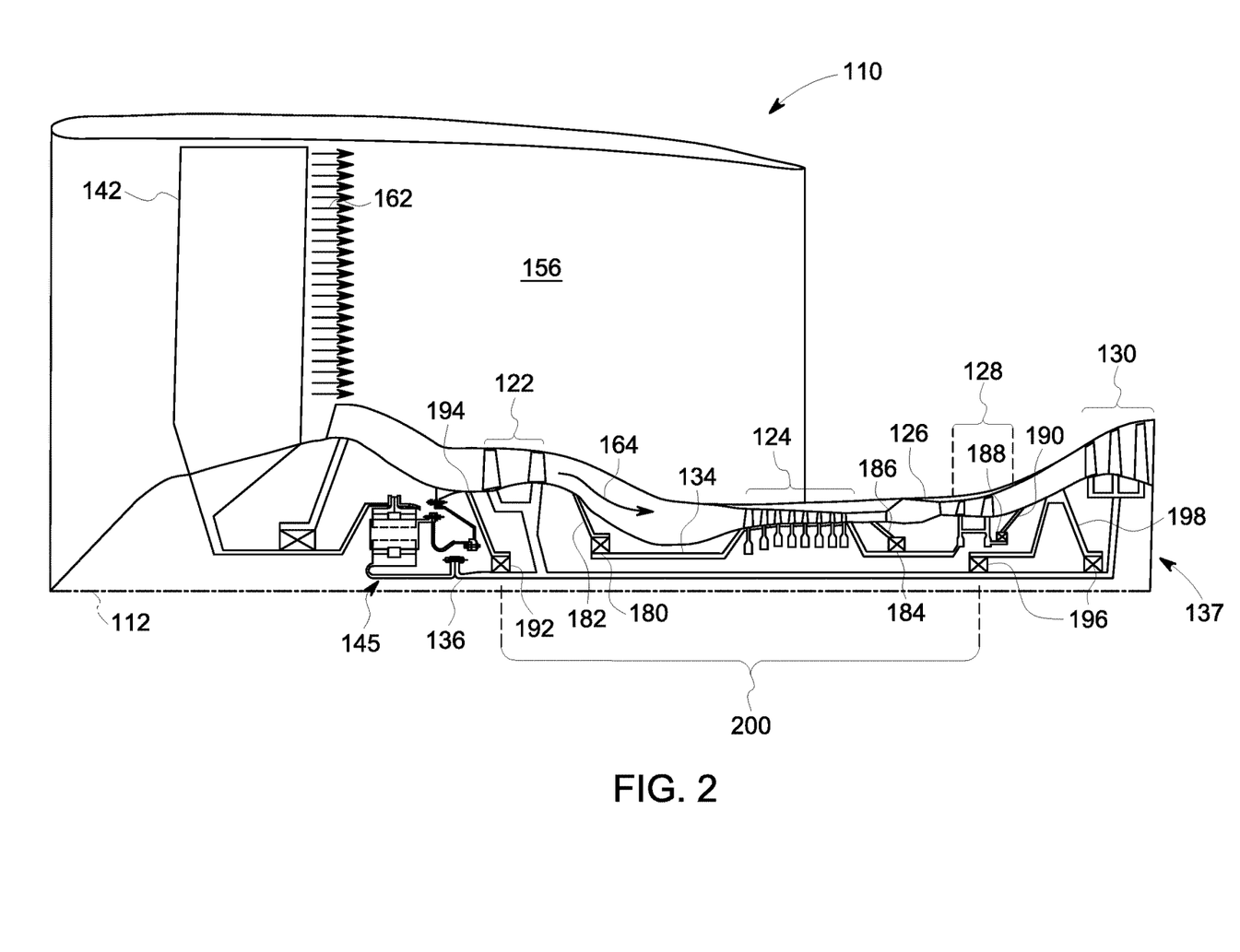
FIG. 2 is an enlarged schematic view of an exemplary rotor shaft assembly of the turbofan engine shown in FIG. 1.

FIG. 2 is an enlarged schematic view of an exemplary rotor shaft assembly 137 of turbofan engine 110. In the exemplary embodiment, LP shaft 136 is co-axial and rotatable about longitudinal axis 112 with HP shaft 134. HP shaft 134 is rotatably supported in turbofan engine 110 by a plurality of bearing assemblies. A first forward bearing assembly 180 couples HP shaft 134 to a static frame assembly 182 at a forward position between LP compressor 122 and HP compressor 124. A first aft bearing assembly 184 couples HP shaft 134 to a static frame assembly 186 at an aft position between HP compressor 124 and HP turbine 128 adjacent to combustion section 126. Additionally, an outboard bearing assembly 188 couples HP shaft 134 to a static frame assembly 190 at an aft position between HP turbine 128 and LP turbine 130. In the exemplary embodiment, first forward and aft bearing assemblies 180 and 184, respectively, are roller element bearings and outboard bearing assembly 188 is a high speed capable bearing such as an air bearing assembly or other high speed bearing type.

LP shaft 136 is also rotatably supported in turbofan engine 110 by a plurality of bearing assemblies. A second forward bearing assembly 192 couples LP shaft 136 to a static frame assembly 194 at a forward position between gearbox 145 and LP compressor 122. Additionally, a second aft bearing assembly 196 couples LP shaft 136 to a static frame assembly 198 at an aft position forward LP turbine 130 and proximate HP turbine 128. For example, a portion of second aft bearing assembly 196 is positioned radially inward from HP turbine 128. In the exemplary embodiment, second forward and aft bearing assemblies 192 and 196, respectively, are roller element bearings.

In the exemplary embodiment, a span 200 of LP shaft 136 is defined between second forward bearing assembly 192 and second aft bearing assembly 196. Span 200 is reduced and/or shortened by positioning a portion of second aft bearing assembly 196 proximate to and radially inward of HP turbine 128. By shortening LP shaft span 200, and maintaining a straddle mount of LP shaft 136, the bending stiffness of LP shaft 136 is increased. Specifically, the bending stiffness of LP shaft 136 is proportional to span 200 of LP shaft 136 cubed (e.g., length$^3$). As such, increasing the bending stiffness of LP shaft 136 induces a change in the natural frequencies of LP shaft 136. Specifically, a bending mode or a third natural frequency mode of the stiffened LP shaft 136 is changed by the bearing assembly positions such that the bending mode is not induced by an operating rotational speed of LP shaft 136 in turbofan engine 110. Said another way, the rotational speed of LP shaft 136 that will excite the third natural frequency mode is greater than the operational limits of LP shaft 136 during operation of turbofan engine 110. The configuration of bearing assemblies 192 and 196 facilitate enabling LP shaft 136 to operate at a higher rotational speed without exciting or traversing the bending or third natural frequency mode of the shaft.

By positioning second aft bearing assembly 196 radially inward from HP turbine 128 the diameter of HP shaft 134 increases. However, increasing the diameter of HP shaft 134 also increases the diameter of the adjacent bearing assembly. As such, first aft bearing assembly 184 is positioned between HP compressor 124 and HP turbine 128 because roller element bearings may be limited in size. As the diameter of the roller element bearing increases, the speed and centrifugal forces therein also increase, thereby, inducing deformation of the components therein. Additionally, the area aft of HP turbine 128 is a high temperature area of turbofan engine 110 that requires increased cooling of the bearing assembly.

However, only including first aft bearing assembly 184 would create an overhung HP shaft 134. An overhung HP shaft 134 increases HP turbine 128 clearance tolerances, thereby, decreasing HP turbine 128 efficiency, and also increases rotordynamic instability. In the exemplary embodiment, outboard bearing assembly 188 is positioned aft of HP turbine 128, and outboard bearing assembly 188 is an air bearing assembly that supports loads from HP shaft 134 through a fluid film. As such, HP shaft 134 is a straddle mounted shaft that enables decreased clearance tolerance within HP turbine 128. Additionally, outboard bearing assembly 188 being an air bearing assembly enables bearing assembly with an increased diameter. For example, outboard bearing assembly 188 has a diameter that is greater than second aft bearing assembly 196. Moreover, outboard bearing assembly 188 is operational under high heat loads.

Figure 3:
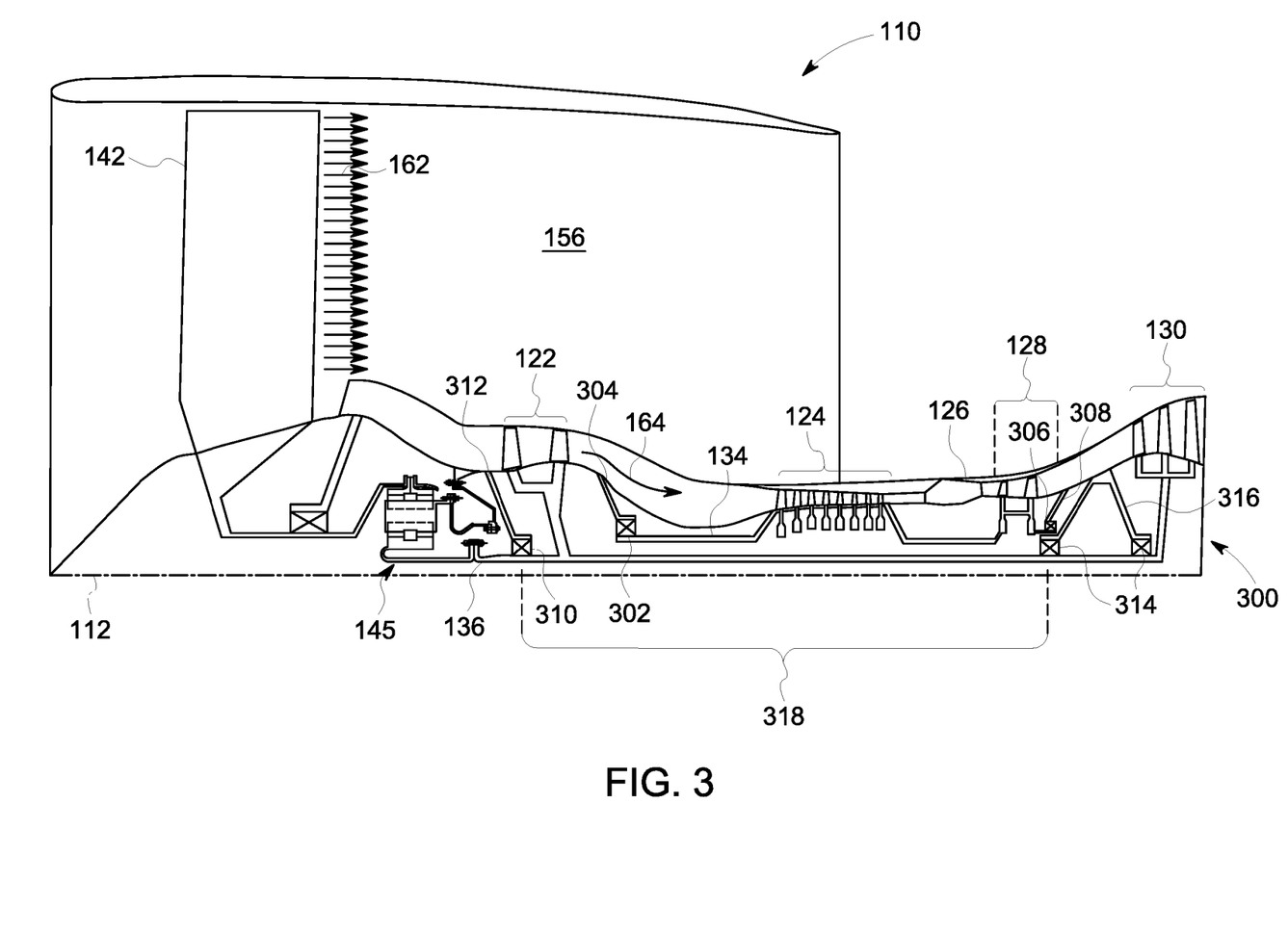
FIG. 3 is a schematic view an alternative rotor shaft assembly that may be used with the turbofan engine shown in FIG. 1.

FIG. 3 is a schematic view an alternative rotor shaft assembly 300 that may be used with turbofan engine 110. Similar to the embodiment described above in reference to FIGS. 1 and 2, LP shaft 136 is co-axial and rotatable about longitudinal axis 112 with HP shaft 134. In this exemplary embodiment, HP shaft 134 is rotatably supported in turbofan engine 110. A first forward bearing assembly 302 couples HP shaft 134 to a static frame assembly 304 at a forward position between LP compressor 122 and HP compressor 124. Additionally, a first aft bearing assembly 306 couples HP shaft 134 to a static frame assembly 308 at an aft position between HP turbine 128 and LP turbine 130. In this exemplary embodiment, first forward and aft bearing assemblies 302 and 306, respectively, are roller element bearings.

LP shaft 136 is also rotatably supported in turbofan engine 110 by a plurality of bearing assemblies. A second forward bearing assembly 310 couples LP shaft 136 to a static frame assembly 312 at a forward position between gearbox 145 and LP compressor 122. Additionally, a second aft bearing assembly 314 couples LP shaft 136 to a static frame assembly 316 at an aft position forward LP turbine 130 and proximate HP turbine 128 and first aft bearing assembly 306. For example, a portion of second aft bearing assembly 314 is in a stacked relationship and positioned radially inward and aligned with first aft bearing assembly 306. As such, first aft bearing assembly 306 has a diameter that is greater than second aft bearing assembly 314. In this exemplary embodiment, second forward and aft bearing assemblies 310 and 314, respectively, are roller element bearings.

Similar to the embodiment described above in reference to FIGS. 1 and 2, in this exemplary embodiment, a span 318 of LP shaft 136 is also shortened by positioning a portion of second aft bearing assembly 314 radially inward of first aft bearing assembly 306. By shortening LP shaft span 318, and maintaining a straddle mount of LP shaft 136, the bending stiffness of LP shaft 136 is increased. As such, increasing the bending stiffness of LP shaft 136 induces a change in the natural frequencies of LP shaft 136. The configuration of bearing assemblies 310 and 314 facilitate enabling LP shaft 136 to operate at a higher rotational speed without inducing the bending or third natural frequency mode of the shaft. Additionally, by stacking first and second aft bearing assemblies 306 and 314 the diameter of first aft bearing assembly 306 is reduced to facilitate use of a roller element bearing assembly.

Figure 4:
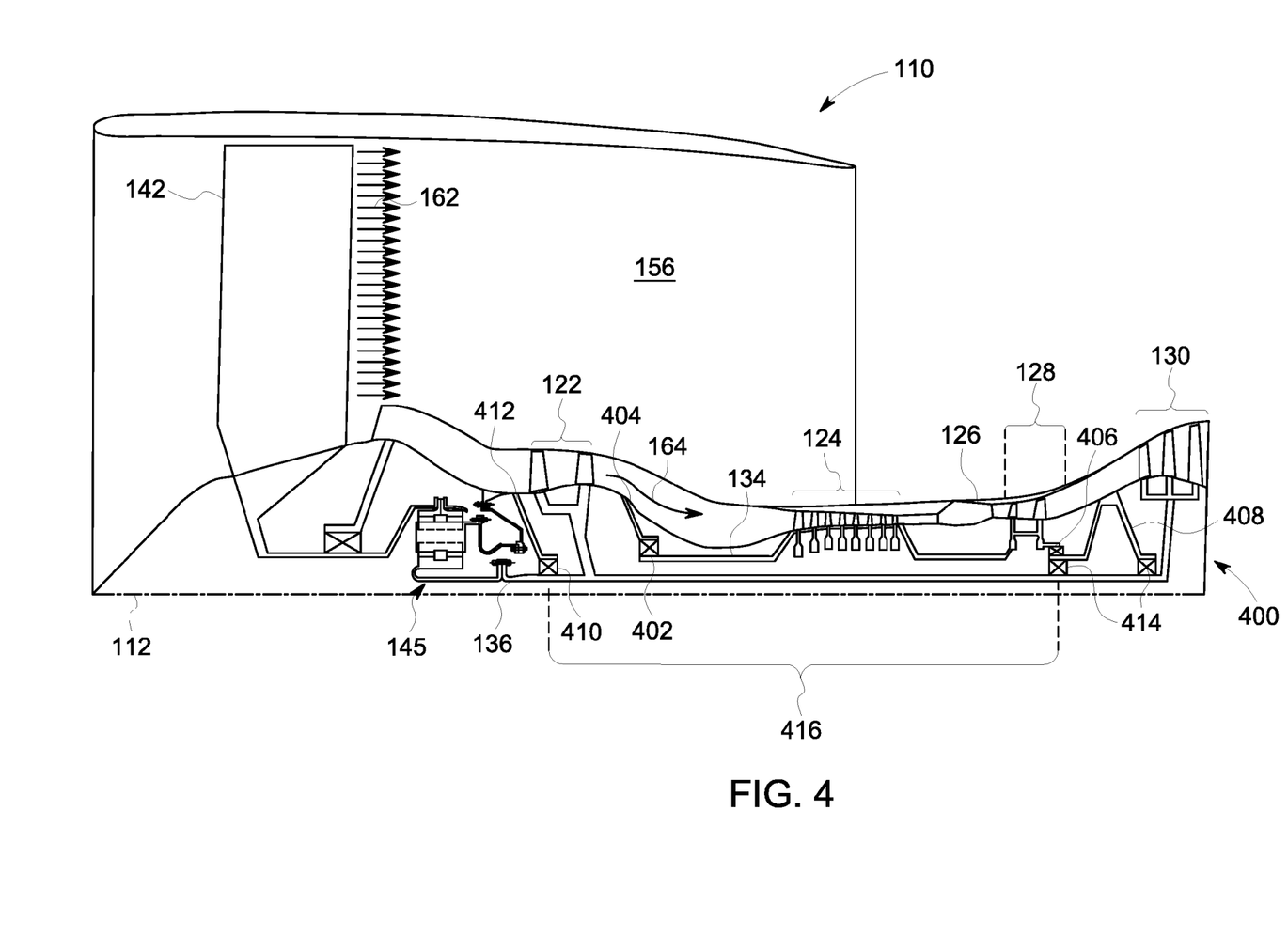
FIG. 4 is a schematic view of another alternative rotor shaft assembly that may be used with the turbofan engine shown in FIG. 1.

FIG. 4 is a schematic view another alternative rotor shaft assembly 400 that may be used with turbofan engine 110. Similar to the embodiments described above, LP shaft 136 is co-axial and rotatable about longitudinal axis 112 with HP shaft 134. In this exemplary embodiment, HP shaft 134 is rotatably supported in turbofan engine 110 by a plurality of bearing assemblies. A first forward bearing assembly 402 couples HP shaft 134 to a static frame assembly 404 at a forward position between LP compressor 122 and HP compressor 124. Additionally, a first aft bearing assembly 406 couples HP shaft 134 to a static frame assembly 408 at an aft position between HP turbine 128 and LP turbine 130. In this exemplary embodiment, first forward and aft bearing assemblies 402 and 406, respectively, are roller element bearings.

LP shaft 136 is also rotatably supported in turbofan engine 110 by a plurality of bearing assemblies. A second forward bearing assembly 410 couples LP shaft 136 to a static frame assembly 412 at a forward position between gearbox 145 and LP compressor 122. Additionally, a second aft bearing assembly 414 couples LP shaft 136 to static frame assembly 408 at an aft position forward LP turbine 130 and proximate HP turbine 128 and first aft bearing assembly 406. For example, a portion of second aft bearing assembly 414 is in a stacked relationship and positioned radially inward and aligned with first aft bearing assembly 406. As such, first aft bearing assembly 406 has a diameter that is greater than second aft bearing assembly 414. Furthermore, first and second aft bearing assemblies 406 and 414 are supported by the same static frame assembly 408 and positioned therebetween. In this exemplary embodiment, second forward and aft bearing assemblies 410 and 414, respectively, are roller element bearings, where bearing assembly 414 has an inner race rotating and bearing assembly 406 has an outer race rotating.

Similar to the embodiments described above, in this exemplary embodiment, a span 416 of LP shaft 136 is also shortened by positioning a portion of second aft bearing assembly 414 radially inward of first aft bearing assembly 406. By shortening LP shaft span 416, and maintaining a straddle mount of LP shaft 136, the bending stiffness of LP shaft 136 is increased. As such, increasing the bending stiffness of LP shaft 136 induces a change in the natural frequencies of LP shaft 136. The configuration of bearing assemblies 410 and 414 facilitate enabling LP shaft 136 to operate at a higher rotational speed without inducing the bending or third natural frequency mode of the shaft. Additionally, by stacking first and second aft bearing assemblies 406 and 414 the diameter of first aft bearing assembly 406 is reduced to facilitate use of a roller element bearing assembly and axial packaging/stacking facilitates a more efficient and compact sump design.

The above-described embodiments provide rotor shaft architectures for gas turbine engines that increase operational rotational speed of a low pressure shaft for geared turbofan engines. More specifically, in the exemplary embodiments, a rotor shaft assembly includes an outer or high pressure shaft that couples a high pressure compressor to a high pressure turbine. The rotor shaft assembly also includes an inner or low pressure shaft rotatable about a common axis with the high pressure shaft, and the low pressure shaft couples a booster compressor to a low pressure turbine. Each shaft, the high pressure shaft and the low pressure shaft, are supported by a plurality of bearing assemblies. An aft bearing assembly that supports the low pressure shaft is positioned proximate the high pressure turbine such that a low pressure shaft span is reduced and low pressure shaft stiffness is increased. As such, an operational rotational speed of the low pressure shaft within the turbofan engine is increased without inducing a bending or third natural frequency mode of the low pressure shaft.

By facilitating a higher operational rotational speed of the low pressure shaft, efficiency of the low pressure turbine is increased. Additionally, the number of turbine stages therein may be reduced, thereby, decreasing turbofan engine weight. In some embodiments, an outboard bearing assembly is coupled aft of the high pressure turbine that enables tighter control of the high pressure turbine clearances, thereby, increasing efficiency of the high pressure turbine. In other embodiments, the aft bearing assembly that supports the low pressure shaft and an aft bearing assembly that supports the high pressure shaft are positioned in a stacked relationship adjacent the high pressure turbine. The stacked relationship enables the aft bearing assembly for the high pressure shaft to include a roller bearing element.

An exemplary technical effect of the systems and methods described herein includes at least one of: (a) increasing stiffness of the low pressure shaft; (b) increasing the operational rotational speed of the low pressure shaft in the turbofan engine without inducing the third natural frequency mode of the low pressure shaft; (c) increasing low pressure turbine efficiency; (d) reducing overall turbofan engine weight; (e) decreasing clearance tolerances in the high pressure turbine, thus increasing high pressure turbine efficiency; and (f) increasing overall turbofan engine efficiency.

Exemplary embodiments of systems and methods for rotor shaft assemblies are described above in detail. The methods and systems are not limited to the specific embodiments described herein, but rather, components of systems and/or steps of the methods may be utilized independently and separately from other components and/or steps described herein. For example, the method may also be used in combination with other turbine components, and are not limited to practice only with the rotor shaft assemblies as described herein. Rather, the exemplary embodiments can be implemented and utilized in connection with many other applications.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A shaft assembly for a rotary machine including a low pressure compressor, a high pressure compressor, a high pressure turbine, and a low pressure turbine in a serial flow relationship, said shaft assembly comprising:
an outer shaft configured to couple the high pressure compressor to the high pressure turbine, said outer shaft comprising:
a first forward bearing assembly positioned forward of the high pressure compressor; and
a first aft bearing assembly positioned between the high pressure compressor and the high pressure turbine; and
an inner shaft rotatable about a common axis with said outer shaft, wherein said outer shaft at least partially extends about said inner shaft, said inner shaft configured to couple the low pressure compressor to the low pressure turbine, wherein said inner shaft is coupled to a gearbox, said inner shaft comprising:
a second forward bearing assembly positioned forward of the low pressure compressor and aft of the gearbox; and
a second aft bearing assembly positioned proximate the high pressure turbine.

2. The shaft assembly in accordance with claim 1, wherein a span of said inner shaft is defined between said second forward bearing assembly and said second aft bearing assembly, said second aft bearing assembly configured to reduce said span of said inner shaft.

3. The shaft assembly in accordance with claim 1, wherein a position of said second forward bearing assembly and a position of said second aft bearing assembly are determined to facilitate increasing a rotational speed of said inner shaft associated with inducing a bending natural frequency mode.

4. The shaft assembly in accordance with claim 1, wherein at least a portion of said second aft bearing assembly is positioned radially inward from the high pressure turbine.

5. The shaft assembly in accordance with claim 1, wherein said outer shaft further comprises an outboard bearing assembly positioned aft of the high pressure turbine.

6. The shaft assembly in accordance with claim 5, wherein said outboard bearing assembly comprises an air bearing assembly.

7. The shaft assembly in accordance with claim 5, wherein said outboard bearing assembly has a first diameter and said second aft bearing assembly has a second diameter, the first diameter greater than the second diameter.

8. The shaft assembly in accordance with claim 1, wherein at least one of said first forward bearing assembly, said second forward bearing assembly, said first aft bearing assembly, and said second aft bearing assembly comprises a roller element bearing.

9. A shaft assembly for a rotary machine including a low pressure compressor, a high pressure compressor, a high pressure turbine, and a low pressure turbine in a serial flow relationship, said shaft assembly comprising:
an outer shaft configured to couple the high pressure compressor to the high pressure turbine, said outer shaft comprising:
a first forward bearing assembly positioned forward of the high pressure compressor; and
a first aft bearing assembly positioned aft of the high pressure turbine; and
an inner shaft rotatable about a common axis with said outer shaft, wherein said outer shaft at least partially extends about said inner shaft, said inner shaft configured to couple the low pressure compressor to the low pressure turbine, wherein said inner shaft is coupled to a gearbox, said inner shaft comprising:
a second forward bearing assembly positioned forward of the low pressure compressor and aft of the gearbox; and
a second aft bearing assembly positioned forward of the low pressure turbine, at least a portion of said second aft bearing assembly is positioned in a stacked relationship with said first aft bearing assembly.

10. The shaft assembly in accordance with claim 9, wherein a span of said inner shaft is defined between said second forward bearing assembly and said second aft bearing assembly, said second aft bearing assembly configured to reduce said span of said inner shaft.

11. The shaft assembly in accordance with claim 9, wherein a position of said second forward bearing assembly and a position of said second aft bearing assembly are determined to facilitate increasing a rotational speed of said inner shaft associated with inducing a bending natural frequency mode.

12. The shaft assembly in accordance with claim 9, wherein a said first aft bearing assembly and at least a portion of said second aft bearing assembly coupled to a static frame assembly.

13. The shaft assembly in accordance with claim 12, wherein said static frame assembly is positioned between said first aft bearing assembly and at least a portion of said second aft bearing assembly.

14. The shaft assembly in accordance with claim 9, wherein said first aft bearing assembly is coupled to a first static frame assembly and said second aft bearing assembly is coupled to a second static frame assembly.

15. The shaft assembly in accordance with claim 9, wherein said first aft bearing assembly has a first diameter and said second aft bearing assembly has a second diameter, the first diameter greater than the second diameter.

16. The shaft assembly in accordance with claim 9, wherein at least one of said first forward bearing assembly, said second forward bearing assembly, said first aft bearing assembly, and said second aft bearing assembly comprises a roller element bearing.

17. A method of assembling a shaft assembly for a rotary machine, including a low pressure compressor, a high pressure compressor, a high pressure turbine, and a low pressure turbine in a serial flow relationship, said method comprising:
coupling the high pressure compressor to the high pressure turbine through an outer shaft;
coupling a first forward bearing assembly to the outer shaft forward of the high pressure compressor;
coupling a first aft bearing assembly to the outer shaft between the high pressure compressor and the high pressure turbine;

coupling the low pressure compressor to the low pressure turbine through an inner shaft, wherein the outer shaft at least partially extends about the inner shaft;

coupling a second forward bearing assembly to the inner shaft forward of the low pressure compressor and aft of a gearbox coupled to the inner shaft;

coupling a second aft bearing assembly to the inner shaft proximate the high pressure turbine; and positioning the outer shaft radially outward from the inner shaft to define a gap therebetween such that the inner shaft and the outer shaft are rotatable about a common axis.

18. The method in accordance with claim 17 further comprising coupling an outboard bearing assembly to the outer shaft aft of the high pressure turbine.

* * * * *